UNITED STATES PATENT OFFICE.

HARRY M. WEBER, OF EAST ORANGE, NEW JERSEY, ASSIGNOR TO ELLIS-FOSTER CO., A CORPORATION OF NEW JERSEY.

CUMARON-RESIN CHEWING GUM.

1,402,817. Specification of Letters Patent. Patented Jan. 10, 1922.

No Drawing. Application filed October 2, 1917. Serial No. 194,387.

*To all whom it may concern:*

Be it known that I, HARRY M. WEBER, a citizen of the United States, residing at East Orange, in the county of Essex and State of New Jersey, have invented certain new and useful Improvements in Cumaron-Resin Chewing Gum, for which the following is a specification.

This invention relates to chewing gum compositions and relates particularly to compositions containing cumaron resin which is a product derived by the polymerization of such bodies as cumaron and indene found in heavy coal tar naphthas. It is obtained commercially from the sludges or residues in the refining of benzol, toluol, xylol, etc.

Cumaron resin may be prepared in various states of plasticity or brittleness and according to the present invention, I preferably employ a product of a readily plastic nature which may be easily incorporated with other ingredients of chewing gum, as for example, chicle, paraffin wax, hydrocarbon oil, and the like, together with the usual sweetening and flavoring agents.

In preparing chewing gum it is an object to secure a product which will not soften too readily in hot summer weather nor be highly brittle in winter weather and which will readily assume the proper degree of plasticity when chewed. Chicle answers this purpose very well and is used in large quantities but it is expensive and difficult to thoroughly purify or refine. The cumaron resin may be obtained in various degrees of plasticity and therefore a grade may be selected which adapts itself readily with chicle to produce a plastic mass which moreover is apparently not so sensitive to temperature changes as some of the chewing gum compositions heretofore placed on the market.

A composition illustrative of the present invention is made by incorporating by aid of heat, 4 parts of chicle with 1 to 2 parts of cumaron resin. The cumaron resin may be softened by the addition of 10% of Russian petroleum oil or similar pure clean hydrocarbon oil. A quantity of sugar equal to from one-half to three-fourths of the foregoing mixture is boiled with water until the syrup is very concentrated forming a "hair" when tested by the usual candy maker's test. The hot syrup and the melted chicle and resin are incorporated and the usual flavoring ingredients such as peppermint, wintergreen, spearmint, etc., suitably added to the mass and the latter rolled out and sheeted and cut in the manner well known in the art.

Another composition is made by melting 5 parts by weight of plastic cumaron resin with 15 parts of chicle, 10 parts of sugar are boiled with 5 parts of water and admixed with the melted chicle. Peppermint oil is added. The sugar content may be greatly increased if desired. Glycerine, waxes, etc., may also be added in some cases.

The quality of the cumaron resin in some cases is improved by washing and heating with alkali under pressure to remove any traces of coal tar bodies of unpleasant taste or odor. It consists mainly of unsaponifiable bodies. The resin may be similarly purified by acid treatment or other suitable refining process. The different grades of cumaron resin may be readily obtained by distilling in vacuum or other ways the mass of the crude cumaron resin producing fractions of different degrees of viscosity and plasticity, selecting from these such fractions as best blend with the grade of chicle, wax, or other ingredient or compound employed in the particular operation in hand as will now be evident from the description set forth above.

With some of the gum materials or gum bases used in the manufacture of chewing gum and particularly chicle, cumaron resin may be used advantageously as a protective agent, assisting in reducing the tendency of the chicle to oxidize and become of a more or less granular character whereby the chewing properties are impaired. Hence the present invention embraces the use of cumaron resin and particularly a form of this resin free from disagreeable odor and flavor due to the presence of coal tar bodies and especially to the use of cumaron resin of a plastic nature readily incorporated with chicle or similar gum basis, and capable of assisting in reducing the degree of oxidation of the gum. Such a mixture or blend is incorporated with sweetening and flavoring agents as required. The presence of cumaron resin appears to assist in retaining the flavor, which I have noted is quite lasting.

In my co-pending application Serial No.

160,486, I have described the use of cumaron resin as a constituent of chewing gum, and claimed a composition containing it, and the present invention is directed more particularly to the use of specific forms of cumaron resin, namely; the softer varieties, melting at say from at or below 35 to 40° C. and upward to the harder varieties. A cumaron resin of the melting point 62° C. such as I have used in a number of my experiments was found when used with equal proportions of chicle to give slightly too hard a product. The chewing gum produced was somewhat tough, that is, not sufficiently yielding. By the addition to the chicle of 10% of a hydrocarbon oil, Russian petroleum oil preferred, on account of its purity and freedom from disagreeable flavor or odor, the resin of 62° melting point was considerably softer and chewing gum made therefrom was of a more yielding character. I also noticed that bodies of the nature of ethyl stearate have a marked softening effect on cumaron resin, even a very small percentage sufficing for the purpose and I have made a gum composition containing cumaron resin, chicle, sugar and flavoring agents, having a small addition of ethyl stearate, as well as one containing a mixture of mineral oil and ethyl stearate as a softening basis. Only a very small amount of ethyl stearate is ordinarily employed, 1 or 2% usually being sufficient for the purpose. In this manner cumaron resin of from 50 to 75° or even higher may be modified or tempered so as to be better adapted for the manufacture of chewing gum.

One formula which I have found satisfactory is made from—

|  | By weight. |
|---|---|
| Chicle | 100 parts. |
| Cumaron (62° M. P.) | 89 " |
| Russian petroleum oil | 10 " |
| Ethyl stearate | 1 " | incorporated with sugar, water and flavoring material to give a yield of about 600 parts. This material chews slightly too sticky at first but on standing and aging the consistency improves.

The determination of the melting point of many resins is difficult owing to the gradual transition of the solid material to a liquid product. This is noticeable in the case of cumaron resin and the melting point referred to herein is that temperature at which the material in a powdered form or finely-divided condition coalesces in a melting point tube to form a fused adhering mass. This point rather than the temperature at which the resin is in a freely liquid condition is used herein as the melting point.

What I claim is:—

1. A chewing gum composition comprising cumaron resin having a melting point of approximately 60° C. an oil softening agent.

2. A chewing gum composition comprising cumaron resin and a mineral oil capable of softening such resin.

3. A chewing gum composition comprising cumaron resin and a softening agent.

4. A chewing gum composition comprising cumaron resin, a softening agent and chicle.

5. A chewing gum basis comprising a major amount of masticable rubbery base incorporated with a lesser amount of a cumaron resin, and a mineral oil.

6. A chewing gum composition comprising a masticable rubbery base incorporated with a lesser amount of plastic cumaron resin and a softening agent.

7. A chewing gum composition comprising cumaron resin; said composition having the property of not softening readily in summer weather nor becoming highly brittle in winter weather and being capable of readily assuming the desired degree of plasticity of chewing gum when masticated, such product containing a mineral oil and ethyl stearate.

HARRY M. WEBER.